United States Patent [19]

Künstlicher et al.

[11] 4,294,421
[45] Oct. 13, 1981

[54] KNIFE HOLDER

[76] Inventors: Erich Künstlicher, Johan Banérs Gata 6, 252 33 Helsingborg; Harry V. Thomasson, Box 29, 260 33 Paarp, both of Sweden

[21] Appl. No.: 140,387
[22] PCT Filed: Dec. 11, 1978
[86] PCT No.: PCT/SE78/00093
§ 371 Date: Aug. 7, 1979
§ 102(e) Date: Aug. 7, 1979
[87] PCT Pub. No.: WO79/00376
PCT Pub. Date: Jun. 28, 1979

[30] Foreign Application Priority Data

Dec. 12, 1977 [SE] Sweden ................. 7714058

[51] Int. Cl.³ .................. A47G 21/14; A47F 7/00
[52] U.S. Cl. ................... 248/37.6; 206/349; 211/60 T; 211/89
[58] Field of Search ............ 248/37.6; 211/60 T, 211/89, 87; 30/296 A, 296 R; D7/74; 206/349, 372; 312/184, 185; 301/63 PW

[56] References Cited

U.S. PATENT DOCUMENTS

| D. 153,492 | 4/1949 | Berland | D7/74 |
| 1,646,068 | 10/1927 | Rosner | 211/87 |
| 2,357,646 | 9/1944 | Gilbert | 248/37.6 |
| 2,591,805 | 4/1952 | Gossett | 211/89 |
| 3,580,394 | 5/1971 | Elliot | 248/37.6 |
| 3,889,809 | 6/1975 | McNair | 211/60 T |
| 4,134,499 | 1/1979 | Joswig | 211/60 T |
| 4,164,251 | 8/1979 | Chung | 301/63 PW |

FOREIGN PATENT DOCUMENTS

| 595056 | 3/1960 | Canada | 248/37.6 |
| 2703367 | 8/1978 | Fed. Rep. of Germany | 211/60 T |

Primary Examiner—James T. McCall
Attorney, Agent, or Firm—Beveridge, DeGrandi, Kline and Lunsford

[57] ABSTRACT

A knife holder has a base (2) which supports several gripping members (9) in the form of rollers (12) of elastomer placed pair-wise in side-by-side relationship and cooperating with each other. The rollers (12) are each mounted on a journal (13) located on the base (2) and have facing circumferential surfaces (14) which form therebetween a nip (15). A knife (10) may be moved with its blade (11) into and out of the nip, the rollers (12) rolling on both sides of the blade and under elastic blade (11) retentive deformation of the rollers. A protective outer casing (3) is removably mounted on the base (2) and has recesses (17) in the region of each gripping member (9) in order to permit ready insertion and removal of the knives (10).

11 Claims, 4 Drawing Figures

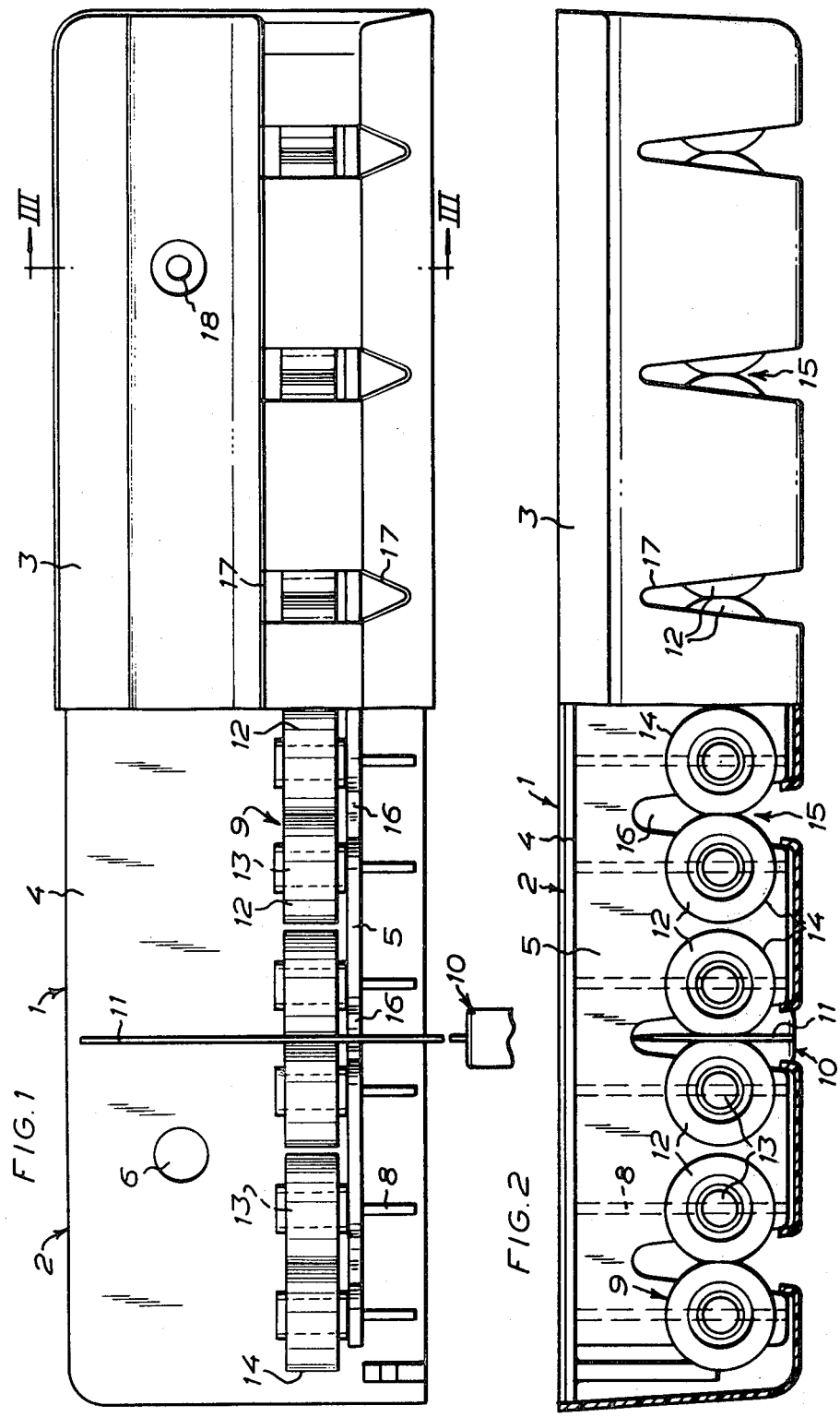

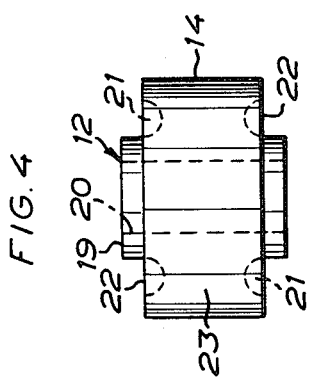
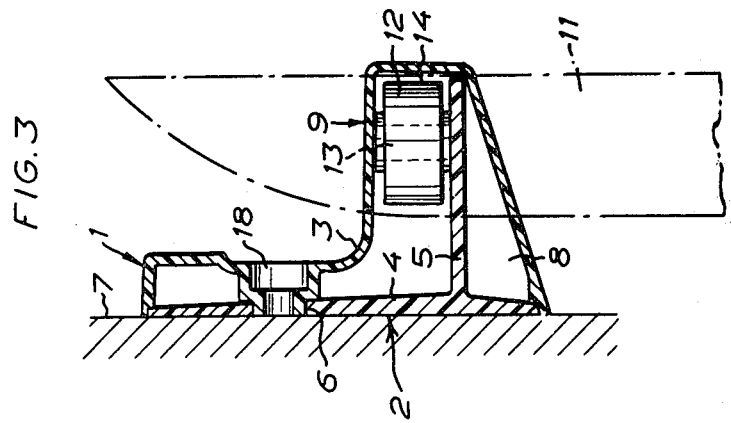

KNIFE HOLDER

The present invention relates to a holder for flatware such as knives and the like, the holder having an elongate base which may be mounted on a surface, for example a wall or the like, and supports one or more gripping members, the knives being individually movable with their blades into and out of retentive engagement therewith.

Flatware holders of this type have been available on the market for many years but have not, because of certain inherent disadvantages, yet enjoyed any great success. Among these disadvantages, mention might be made of the fact that the gripping members, after a period of use, lose their gripping capacity, with the result that the knife or knives held in place suddenly and without prior warning come loose from the holder and fall down onto a sink or kitchen unit located beneath the holder, thereby either being damaged or causing injury to anyone in the vicinity of the sink unit. Conversely, the gripping members may, after a time, become jammed so that it becomes impossible either to remove or insert a knife. This latter disadvantage is particularly manifest in that type of holder in which the gripping members consist of clamping rollers or the like which are movable along a ramp surface.

In the type of holder in which the gripping members consist of magnets for magnetic retention of the knives, there is a risk that the knives, on being lightly jolted, loosen from the magnets with the consequential risk that the knives themselves are damaged or that a person nearby is injured.

In both the magnetic type of gripping member and in gripping members of metal in general, there is also the disadvantage that the cutting edge of the knife may be damaged on contact with the metal, and, if the knife edge is turned outwardly in the holder to avoid this risk such that the edge never comes into contact with the metal, there is instead the risk that the exposed edge of the knife in the holder will cause injury to a person standing or passing nearby.

The major object of the present invention is, by means of a novel and unique construction and function in the gripping members of a holder of the type disclosed by way of introduction, to obviate primarily the above-discussed disadvantages, thus realizing a flatware holder which is reliable and functionally acceptable from all points of view.

This object is achieved according to the invention in that each gripping member comprises two rollers placed in side by side relationship and cooperating with each other, the rollers being wholly or partly made of an elastomer and each being mounted on a journal located on the base, the rollers having facing circumferential surfaces which form a nip, the knife blade being movable into and out of the nip with the rollers rolling on both sides of the blade under elastic, blade-retentive deformation of the rollers.

The invention will be described in greater detail below with reference to the accompanying drawings which show a particularly preferred embodiment of the holder according to the invention.

FIG. 1 is a front elevation of the holder according to the invention, in the left-hand half of the drawing, the outer casing having been broken away for purposes of illustrating details inside the casing.

FIG. 2 shows the holder of FIG. 1 from above with the outer casing in the left-hand half of the drawing being in section.

FIG. 3 is a cross-section taken along the line III—III in FIG. 1.

FIG. 4 is a side elevation of one of several rollers included in the holder according to the invention.

The holder according to the invention shown on the drawings and generally designated 1 has, as major components, a base 2 and an outer casing 3.

The base 2 is made of a suitable plastics and has a generally elongate form. The base is composed of a substantially rectangular and vertically directed mounting plate 4 and a substantially horizontally directed bracket 5 produced integrally therewith. The mounting plate 4 displays suitably located through-holes 6 for allowing the passage of fixing devices (not shown) for mounting the plate 4, and thereby the entire base 2, to a vertical surface 7, for example a wall or the like, the fixing devices (not shown) being also passed, in a manner which will be described below, through holes in the outer casing 3 for simultaneous fixing of the casing to the base.

The bracket 5 is, as was mentioned above, produced integrally with the mounting plate 4 and is in the form of a relatively thin shelf, struts 8 being provided for reinforcing the connection of the bracket 5 to the plate 4. In the illustrated embodiment, the bracket 5 carries six gripping members 9, knives (of which one is shown at 10) being individually movable with their blades 11 into and out of retentive engagement with the gripping members.

Each gripping member 9 comprises two rollers 12 in side-by-side relationship and cooperating with each other, the rollers in the illustrated embodiment being wholly manufactured of a suitable elastomer. The rollers 12 are each mounted on a journal 13 which is integrally manufactured with the bracket 5 and extends vertically upwardly therefrom, the rollers having facing circumferential surfaces 14. If, in an alternative embodiment, the entire rollers 12 are not manufactured from elastomer, at least the circumferential surfaces 14 are manufactured from such material. The facing circumferential surfaces 14 on the rollers 12 in each gripping member 9 form a nip 15 into and out of which the knife blade 11 may be moved, the rollers 12 rolling on the opposing sides of the blade and either the rollers or their circumferential surfaces 14 being deformed in order fixedly to retain the blade between themselves.

In order to guarantee the retentive force against the knife blade 11 or increase this force when the blade is inserted in the nip 15, both of the rollers 12 included in each gripping member 9 are identical in shape and size and the journals 13 for these rollers are spaced a slightly less mutual distance from each other than the diameter of each roller so that the facing circumferential surfaces 14 of the rollers 12 forming the nip 15 abut elastically deformed against each other as is apparent from the left-hand half of FIG. 1.

In order that the knife blade 11 readily be movable into and out of the nip 15 between the circumferential surfaces 14 of the rollers 12 for insertion or removal, the bracket 5 has, in the region of each nip 15, a recess 16 which is open at its forward end and V-shaped in horizontal projection.

For the same reason, the outer casing 3 (which is suitably, removably mounted on the base 2) has recesses 17 above and below the rollers 12 in each gripping member 9, the recesses being forwardly or outwardly open and V-shaped in horizontal projection. More precisely, the outer casing 3 (which is made of a suitable plastics) is applied over the gripping members 9 in order to cover and protect them from damage at the same time as it, naturally, is to assist in imparting an attractive appearance to the holder 1 as a whole. The outer casing 3 is snugly fitted on the mounting plate 4 about the periphery of the plate and is provided with through-holes 18 so that the fixing devices (not shown) may be passed through the holes 6 and 18 in both the mounting plate 4 and the outer casing 3 for fixedly anchoring the holder 1 to the surface 7 and the outer casing 3 on the plate 4.

One of the rollers 12 included in the holder 1 according to the invention is shown in FIG. 4. Apart from the previously mentioned circumferential surface 14, this roller has a hub 19 with a through-hole 20 for the journal 13. In order to impart to the circumferential surface the requisite elasticity, it is possible, as shown on the drawing, to provide circumferential grooves 21 on the side surfaces 22 of the roller 12 so that the circumferential surface 14 is connected to the hub 19 by the intermediary of a slighter web 23, which thereby imparts greater radial elasticity to the circumferential surface.

The embodiment described above and shown on the drawings is to be particularly preferred, but it should be observed that many other embodiments and detail variations are possible within the spirit and scope of the claimed patent protection.

We claim:

1. A holder for knives and similar flatware, the holder having an elongate base which may be mounted on a surface for example a wall or the like and supports one or more gripping members with which the knives may individually be moved with their blades into and out of retentive engagement, characterized in that each gripping member comprises two rollers in side by side relationship and cooperating with each other, the rollers being at least partially made of an elastomer material and each being mounted on a journal located on the base, the rollers having facing circumferential surfaces which form a nip into and out of which the knife blade may be moved, with the rollers rolling on the two sides of the blade under elastic blade-retentive deformation of the rollers.

2. A holder according to claim 1, characterized in that both rollers included in each gripping member are identical, and that the journals therefor have a mutual spacing which is less than the diameter of each respective roller, such that the facing circumferential surfaces of the rollers, forming the nip, abut elastically deformed against each other in order to increase the retentive force against the knife blade when same is inserted in the nip.

3. A holder according to claim 1 or 2, characterized in that the base comprises a substantially vertical mounting plate for mounting the holder on the surface and a substantially horizontally directed bracket integral with the mounting plate, and that the journals of the rollers are integral with the bracket and are directed substantially vertically upwardly therefrom.

4. A holder according to claim 3, characterized in that the bracket is provided, in the region of each gripping member, with a recess leaving a free passage for the knife blade.

5. A holder according to claim 4, characterized in that a protective outer casing is removably mounted on the base suitably on the mounting plate thereof, and has outwardly open recesses in the region of each gripping member in order to permit ready insertion and removal of the knives.

6. A holder according to claim 3, characterized in that a protective outer casing is removably mounted on the base suitably on the mounting plate thereof, and has outwardly open recesses in the region of each gripping member in order to permit ready insertion and removal of the knives.

7. A holder according to claim 1 further comprising a mounting plate attached to said base, and a protective outer casing removably mounted on the base suitably on the mounting plate thereof and having outwardly open recesses in the region of each gripping member in order to permit ready insertion and removal of the knives.

8. A holder according to claim 2 further comprising a mounting plate attached to said base, and a protective outer casing removably mounted on the base suitably on the mounting plate thereof and having outwardly open recesses in the region of each gripping member in order to permit ready insertion and removal of the knives.

9. A holder as claimed in any one of claims 1, 2, 7, or 8 wherein said rollers are wholly made of an elastomer material.

10. A holder for knives and similar flatware, the holder having an elongate base which may be mounted on a surface for example a wall or the like and supports one or more gripping members with which the knives may individually be moved with their blades into and out of retentive engagement, characterized in that each gripping member comprises two rollers in side by side relationship and cooperating with each other, the rollers being at least partially made of an elastomer material and each being mounted on a substantially vertically directed journal located on the base, the rollers having facing circumferential surfaces which form a nip into and out of which the knife blade may be moved, with the rollers rolling on the two sides of the blade under elastic blade-retentive deformation of the rollers.

11. A holder for knives and similar flatware, the holder having an elongate base which may be mounted on a surface for example a wall or the like and supports one or more gripping members with which the knives may individually be moved with their blades into and out of retentive engagement, characterized in that each gripping member comprises two rollers in side by side relationship and cooperating with each other, the rollers being at least partially made of an elastomer material and each being mounted on a journal located on the base, the rollers having facing circumferential surfaces which form a nip into and out of which the knife blade may be moved, with the rollers rolling on the two sides of the blade under elastic blade-retentive deformation of the rollers, thereby constituting the sole means of support for said knives.

* * * * *